US008821340B2

(12) United States Patent
Schoolcraft (10) Patent No.: US 8,821,340 B2
(45) Date of Patent: Sep. 2, 2014

(54) SYSTEM AND METHOD FOR CONTROLLING ENDLOAD FORCE OF A VARIATOR

(75) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 695 days.

(21) Appl. No.: 12/966,172

(22) Filed: Dec. 13, 2010

(65) Prior Publication Data
US 2011/0152031 A1    Jun. 23, 2011

Related U.S. Application Data

(60) Provisional application No. 61/287,020, filed on Dec. 16, 2009.

(51) Int. Cl.
*F16H 15/38*    (2006.01)

(52) U.S. Cl.
USPC ............. 476/9; 476/10; 476/40; 476/41

(58) Field of Classification Search
USPC ............. 476/2, 9, 10, 41, 48, 61, 40
See application file for complete search history.

(56) References Cited

U.S. PATENT DOCUMENTS

| | | | |
|---|---|---|---|
| 888,265 A * | 5/1908 | Ruland | 475/217 |
| 4,671,166 A | 6/1987 | Glaze et al. | |
| 4,838,126 A | 6/1989 | Wilfinger et al. | |
| 4,922,788 A | 5/1990 | Greenwood | |
| 5,090,951 A | 2/1992 | Greenwood | |
| 5,217,418 A | 6/1993 | Fellows et al. | |
| 5,232,414 A | 8/1993 | Fellows et al. | |
| 5,242,337 A | 9/1993 | Greenwood | |
| 5,263,907 A | 11/1993 | Fellows | |
| 5,308,297 A | 5/1994 | Greenwood | |
| 5,308,298 A | 5/1994 | Lambert | |
| 5,316,526 A | 5/1994 | Fellows | |
| 5,338,268 A | 8/1994 | Greenwood | |

(Continued)

FOREIGN PATENT DOCUMENTS

| | | |
|---|---|---|
| GB | 2361510 | 10/2001 |
| GB | 2368618 | 5/2002 |

(Continued)

OTHER PUBLICATIONS

International Search Report and the Written Opinion for International Application No. PCT/US2010/060032, dated Feb. 11 2011, (9 pages).

(Continued)

*Primary Examiner* — William C Joyce
(74) *Attorney, Agent, or Firm* — Barnes & Thornburg LLP (57) ABSTRACT

A system and method for controlling the endload force of a variator includes reducing a net force applied to a variator input disc of the variator. The variator includes an endload chamber, a subtraction chamber, and a valve fluidly coupled between the endload chamber and the subtraction chamber. Each of the endload chamber and the subtraction chamber applies an opposing force to the variator input disc. The valve is activateable to reduce the net force applied to the variator input disc. The valve may be activated based on the variator ratio, the position of the variator roller, and/or other parameters of the variator or operation thereof.

10 Claims, 7 Drawing Sheets

(56) References Cited

U.S. PATENT DOCUMENTS

| | | | |
|---|---|---|---|
| 5,395,292 A | 3/1995 | Fellows et al. |
| 5,401,221 A | 3/1995 | Fellows et al. |
| 5,423,727 A | 6/1995 | Fellows |
| 5,453,061 A | 9/1995 | Fellows |
| 5,521,819 A | 5/1996 | Greenwood |
| 5,564,993 A | 10/1996 | Robinson |
| 5,564,998 A | 10/1996 | Fellows |
| 5,643,121 A | 7/1997 | Greenwood et al. |
| 5,667,456 A | 9/1997 | Fellows |
| 5,766,105 A | 6/1998 | Fellows et al. |
| 5,820,508 A | 10/1998 | Konig et al. |
| 5,820,513 A | 10/1998 | Greenwood |
| 5,895,337 A | 4/1999 | Fellows et al. |
| 5,938,557 A | 8/1999 | Greenwood |
| 5,971,885 A | 10/1999 | Greenwood et al. |
| 6,030,310 A | 2/2000 | Greenwood et al. |
| 6,066,067 A | 5/2000 | Greenwood |
| 6,071,209 A | 6/2000 | Greenwood |
| 6,162,144 A | 12/2000 | Haka |
| 6,224,509 B1 | 5/2001 | Gierling |
| 6,273,839 B1 | 8/2001 | Dutson |
| 6,292,732 B1 | 9/2001 | Steinmetz et al. |
| 6,306,060 B1 | 10/2001 | Dutson et al. |
| 6,312,356 B1 | 11/2001 | Greenwood |
| 6,336,878 B1 | 1/2002 | Ehrlich et al. |
| 6,364,811 B1 | 4/2002 | Hubbard et al. |
| 6,464,614 B2 | 10/2002 | Dutson |
| 6,561,934 B2 * | 5/2003 | Kashiwase .................. 474/28 |
| 6,626,793 B1 | 9/2003 | Greenwood |
| 6,666,791 B1 | 12/2003 | Greenwood |
| 6,979,276 B2 | 12/2005 | Murray |
| 7,018,320 B2 | 3/2006 | Robinson et al. |
| 7,056,261 B2 | 6/2006 | Fuller |
| 7,160,226 B2 | 1/2007 | Fuller |
| 7,278,951 B2 | 10/2007 | Fuller |
| 7,318,786 B2 * | 1/2008 | Greenwood et al. ............ 476/10 |
| 7,407,459 B2 | 8/2008 | Greenwood et al. |
| 7,491,149 B2 | 2/2009 | Greenwood et al. |
| 7,530,916 B2 | 5/2009 | Greenwood |
| 7,563,194 B2 | 7/2009 | Murray |
| 7,614,973 B2 | 11/2009 | Parthuisot |
| 7,625,309 B2 | 12/2009 | Fuller |
| 7,632,208 B2 | 12/2009 | Greenwood et al. |
| 7,637,841 B2 | 12/2009 | Dutson |
| 7,951,041 B2 | 5/2011 | Dutson |
| 7,955,210 B2 | 6/2011 | Greenwood et al. |
| 2001/0041642 A1 | 11/2001 | Miyata |
| 2004/0038773 A1 | 2/2004 | Robinson et al. |
| 2005/0043138 A1 | 2/2005 | Fuller |
| 2005/0143216 A1 | 6/2005 | Greenwood et al. |
| 2005/0176547 A1 | 8/2005 | DeFreitas |
| 2005/0211295 A1 | 9/2005 | Long et al. |
| 2006/0142110 A1 | 6/2006 | Greenwood et al. |
| 2006/0160656 A1 | 7/2006 | Dutson |
| 2006/0184303 A1 | 8/2006 | Long et al. |
| 2006/0201766 A1 | 9/2006 | Fuller |
| 2007/0072736 A1 | 3/2007 | Defreitas et al. |
| 2007/0099739 A1 | 5/2007 | Foster et al. |
| 2007/0112495 A1 | 5/2007 | Murray |
| 2007/0142163 A1 | 6/2007 | Murray |
| 2007/0275817 A1 | 11/2007 | Newall |
| 2008/0006107 A1 | 1/2008 | Dreher et al. |
| 2008/0085801 A1 | 4/2008 | Sedoni et al. |
| 2008/0146399 A1 | 6/2008 | Oliver et al. |
| 2008/0153659 A1 | 6/2008 | Greenwood |
| 2008/0176709 A1 | 7/2008 | Wu et al. |
| 2008/0269001 A1 | 10/2008 | Greenwood et al. |
| 2009/0048054 A1 | 2/2009 | Tsuchiya et al. |
| 2009/0062065 A1 | 3/2009 | Field et al. |
| 2009/0075772 A1 | 3/2009 | Ellis et al. |
| 2009/0132135 A1 | 5/2009 | Quinn, Jr. et al. |
| 2009/0203486 A1 | 8/2009 | Murray |
| 2009/0253552 A1 | 10/2009 | Foster |
| 2009/0305840 A1 | 12/2009 | Oliver |
| 2011/0138898 A1 | 6/2011 | Long et al. |
| 2011/0140017 A1 | 6/2011 | Long et al. |
| 2011/0143882 A1 | 6/2011 | Long et al. |
| 2011/0144872 A1 | 6/2011 | Long et al. |
| 2011/0144925 A1 | 6/2011 | Long et al. |

FOREIGN PATENT DOCUMENTS

| | | |
|---|---|---|
| GB | 2384531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |
| WO | WO 97/40292 | 10/1997 |

OTHER PUBLICATIONS

International Search Report and the Written Opinion for International Application No. PCT/US2010/056247, dated Jan. 21, 2011, (10 pages).
Torotrak Full toroidal variator (http://www.torotrak.com/IVT/works/variator.htm) 5 pages (accessed Sep. 24, 2009).
International Search Report and the Written Opinion for International Application No. PCT/US2010/058705, dated Feb. 11, 2011, (12 pages).
International Search Report and the Written Opinion for International Application No. PCT/US2010/058707, dated Feb. 1, 2011, (8 pages).
International Search Report and the Written Opinion for International Application No. PCT/US2010/056244, dated Jan. 21, 2011, (9 pages).
U.S. Appl. No. 61/286,974, filed Dec. 16, 2009, Long et al.
U.S. Appl. No. 61/286,984, filed Dec. 16, 2009, Long et al.
U.S. Appl. No. 61/287,003, filed Dec. 16, 2009, Long et al.
U.S. Appl. No. 61/287,031, filed Dec. 16, 2009, Long et al.
U.S. Appl. No. 61/287,038, filed Dec. 16, 2009, Long et al.
International Search Report and Written Opinion received for International Application No. PCT/US2010/056242, mailed Jan. 10, 2011, 10 pages.

* cited by examiner

SYSTEM AND METHOD FOR CONTROLLING ENDLOAD FORCE OF A VARIATOR

TECHNICAL FIELD

This application claims priority under 35 U.S.C. §119(e) to U.S. Provisional Patent Application Ser. No. 61/287,020 entitled "System and Method for Controlling Endload Force of a Variator," by Brian Schoolcraft, which was filed on Dec. 16, 2009, the entirety of which is hereby incorporated by reference.

TECHNICAL FIELD

The present disclosure relates generally to continuously variable and infinitely variable transmissions, and more particularly, to an endload force control system for a continuously variable transmission of the toroidal type.

BACKGROUND

In a continuously variable transmission, a ratio varying unit ("variator") is used to provide a continuous variation of transmission ratio. The variator is coupled between the transmission input and the transmission output via gearing and one or more clutches. In the variator, torque is transmitted by frictional engagement of variator discs and corresponding rollers separated by a traction fluid. In toroidal-type variators, each input and output variator disc includes a curved, confronting contact surface that cooperate to form a toroidal void or chamber in which the variator rollers are positioned.

The variator rollers are controlled by a hydraulic piston/cylinder arrangement, which applies a force to the rollers based on a pressure difference applied to the hydraulic piston. The output torque of the variator is defined by the control piston force acting on the variator rollers. The position or contact angle of each roller on the corresponding input and output variator discs is dependent on the variator ratio, which is defined by the resulting speed ratio between the output and input discs. An endload assembly applies an axial force on the end endload disc, which in turn applies a normal force to the variator discs to ensure traction of the rollers on the corresponding discs. However, at extreme low or high variator ratio, the contact normal force applied to the rollers by the variator discs increases in proportion to the force on the roller control pistons due to the contact angle of the variator roller on the discs. Such increase in the contact normal force at extreme contact angles may result in overclamping of the rollers, reduction of variator efficiency, and/or reduction of component life.

SUMMARY

According to one aspect, a variator may include an endload chamber, a subtraction chamber, and a valve. The endload chamber may be configured to apply an amount of force to a variator input disc of the variator based on fluid pressure within the endload chamber. The subtraction chamber may be configured to apply an amount of force to the variator input disc in a second direction opposite the first direction based on fluid pressure within the subtraction chamber such that the net force applied to the variator input disc is reduced. The valve may have a first port fluidly coupled to the endload chamber and a second port fluidly coupled to the subtraction chamber. The valve may be movable to a first position in which the endload chamber and the subtraction chamber are not fluidly coupled and to a second position in which the endload chamber and the subtraction chamber are fluidly coupled. The valve may be embodied as a solenoid valve, a mechanical valve, or other type of valve. In embodiments wherein the valve is a solenoid valve, the valve may be responsive to a control signal to move to the second position.

In some embodiments, the variator may further include a variator output disc and at least one roller. In such embodiments, the variator input disc may be biased toward the variator output disc by the net force applied to the variator input disc. The roller(s) may be located between the variator input disc and the variator output disc to transmit torque from the input disc to the output disc. Additionally, the at least one roller may be positionable with respect to the variator input disc and the variator output disc to adjust a variator ratio of the variator. In such embodiments, the valve may be embodied as a mechanical valve coupled to the roller and configured to move from the first position to the second position based on the position of the roller. Additionally or alternatively, the amount of force applied by the variator input disc may be dependent upon the position of the roller. Additionally or alternatively, the valve may be configured to move to the second position when the variator ratio is greater than −0.5. Additionally or alternatively, the valve may be configured to move to the second position when the variator ratio is less than −2.0. For example, the valve may be configured to move to the second position when variator ratio is outside a variator ratio range of −0.5 to −2.0. In some embodiments, the position of the roller on the variator input disc defines a contact point and the valve may be configured to move to the second position when the contact point is outside the range of 47 millimeters to 88 millimeters from a predetermined reference point.

Additionally, in some embodiments, the subtraction chamber may be sized to reduce the net force applied to the variator input disc at least 5% when the valve is in the second position relative to the net force applied to the variator input disc when the valve is in the first position. For example, the subtraction chamber may be sized to reduce the net force applied to the variator input disc by a percentage amount in the range of 5% to 10% when the valve is in the second position. In one particular embodiment, the subtraction chamber is sized to reduce the net force applied to the variator input disc by about 7.5% when the valve is in the second position.

In some embodiments, the variator may include a variator output disc and a roller located between the variator input disc and the variator output disc to transmit torque from the variator input disc to the variator output disc. The variator input disc may be biased toward the variator output disc by the net force applied to the variator input disc. The variator input disc may also apply a contact normal force on the roller. The ratio of the amount of contact normal force applied to the roller by the variator input disc to a minimum amount of contact normal force applied to the roller by the variator input disc defines a contact normal multiplication value. In such embodiments, the valve may be configured to move to the second position when the contact normal force multiplication value is at least 1.07.

According to another aspect, a variator may include an endload assembly, a variator output disc, at least one roller, and a valve. The endload assembly may include an endload drum, an endload reaction plate, and a variator input disc. The variator may also include an endload chamber defined between the endload reaction plate and the variator input disc and a subtraction chamber defined between the endload drum and the endload reaction plate. The endload chamber and the subtraction chamber may cooperate to apply a net force to variator input disc. The variator input disc may be biased toward the variator output disc by the net force. The at least one roller may be located between the variator input disc and the variator output disc to transmit torque from the input disc to the output disc. Additionally, the at least one roller may be positionable with respect to the variator input disc and the variator output disc to adjust a variator ratio. The valve may be fluidly coupled between the endload chamber and the subtraction chamber. The valve may also be movable to a first position to fluidly decouple the endload chamber and the subtraction chamber and to a second position to fluidly couple the endload chamber and the subtraction chamber.

In some embodiments, the net force applied to the input disc when the valve is in the first position is greater than the net force applied to the input disc when the valve is in the second position. Additionally, in some embodiments, the valve may be embodied as a solenoid valve responsive to a control signal to move to the second position. Alternatively, the valve may be embodied as a mechanical valve coupled to the roller and configured to move from the first position to the second position based on the position of the roller. In some embodiments, the net force applied to the variator input disc is based on a variator ratio of the variator. Additionally, in some embodiments, the net force applied to the variator input disc is based on the position of the roller. Further, in some embodiments, the variator input disc applies a contact normal force to the at least one roller. The ratio of the amount of contact normal force applied to the roller by the variator input disc to a minimum amount of contact normal force applied to the roller by the variator input disc defines a contact normal force multiplication value. In such embodiments, the valve may be configured to move to the second position when the contact normal force multiplication value is at least 1.07

According to a further aspect, a method for controlling endload force in a variator including an endload chamber and a subtraction chamber may include determining a variator ratio of the variator and activating a valve fluidly coupled between the endload chamber and the subtraction chamber in response to the variator ratio being outside a predetermined range. Activating the valve may fluidly couple the endload chamber to the subtraction chamber to reduce a net force applied to the variator input disc by a predetermined amount.

DESCRIPTION OF THE DRAWINGS

The systems and methods described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
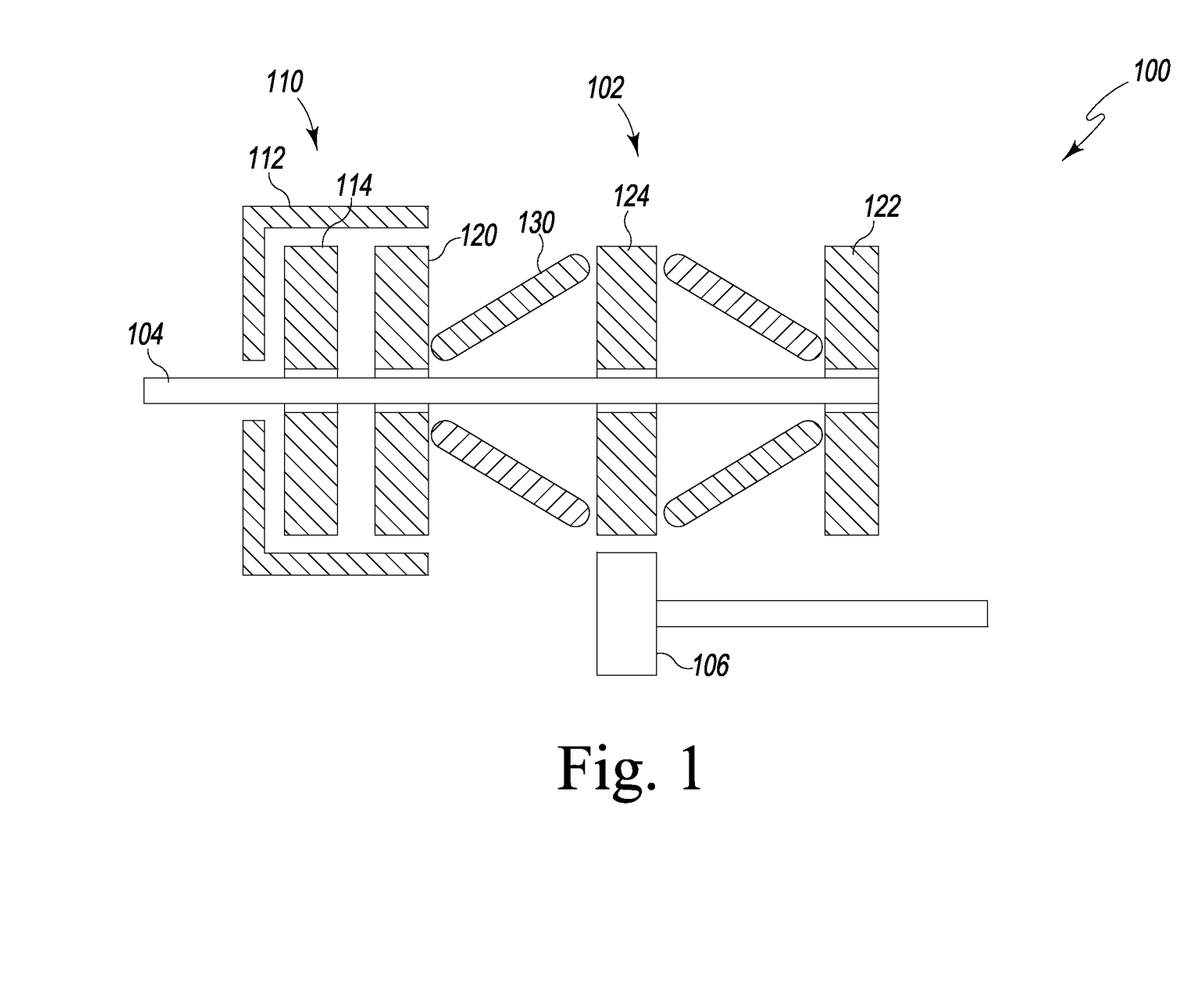
FIG. 1 is a simplified, cross-sectional block diagram of one embodiment of a continuously variable transmission including a variator therein.

Referring to FIG. 1, a transmission 100 includes a variator 102 positioned between an input shaft 104 and a gearing assembly 106. The variator 102 is of the toroidal type and includes an endload assembly 110 having an endload drum 112, an endload reaction plate 114, and a first input variator disc 120. The variator 102 also includes a second input variator disc 122 and one or more output discs 124 positioned between the first and second input variator discs 120, 122. The gearing assembly 106 is operatively coupled to the output disc(s) 124 via suitable linkage such as a clutch assembly, idler set, gear set, or the like. Of course, it should be appreciated that in other embodiments, the variator 102 may have other configurations. For example, in some embodiments, the location of the input discs 120, 122 may be switched with the output disc(s) 124. That is, the input discs 120, 122 may be centrally located in the variator 102 between two output discs 124. Additionally, the endload assembly 110 may be located on either end of the variator 102 (i.e., on the end at which the input disc 120 is located or the end at which the input disc 122 is located). Further, in some embodiments, the endload assembly 110 may be located centrally in the variator 102 between the two input discs 120, 122 or output discs 124 depending on the particular configuration of the variator 102. In such embodiments, the endload assembly 110 may include one or more input discs 120, 122 or one or more output discs 124 depending again on the particular configuration of the variator 102 such as the location of the endload assembly 110.

The variator 102 is illustrative embodied as a toroidal-type variator. As such, each of the variator discs 120, 122, 124 includes opposing or confronting surfaces 200 (see FIG. 2), which are curved to form a substantially toroidal void or space between the input variator disc 120 and the output variator disc 124 and between the input variator disc 122.

The variator 102 also includes at least one variator roller 130 positioned between the input variator disc 120 and the output variator disc 124 and between the output variator disc 124 and the input variator disc 122. For example, in the illustrative embodiment, the variator 102 includes three rollers 130 positioned between each of the input variator discs 120, 122 and the output variator disc 124. However, in other embodiments, the variator 102 may include more or fewer rollers 130. The rollers 130 provide traction between the input variator discs 120, 122 and the output variator disc 124 to transfer torque from the input variator discs 120, 122 to the output variator disc 124. In some embodiments, an amount of oil or other traction fluid is captured between the roller 130 and the discs 120, 122, 124 such that the roller 130 rolls against the toroidal contact surfaces of the discs 120, 122, 124 without directly contacting the discs 120, 122, 124.

Each of the rollers 130 is positionable with respect to the corresponding input discs 120, 122 and the output disc 124 based, in part, on a pressure difference applied to a hydraulic actuator. That is, the variator 102 includes one or more hydraulic actuators 420 (see FIG. 4) coupled to associated rollers 130 to move the rollers 130 between the respective input discs 120, 122 and the output disc 124. It should be appreciated, however, that the particular contact angle of each roller 130 with respect to the discs 120, 122, 124 is determined based on the relative angular speed of the discs 120, 122, 124. In the illustrative transmission 100, a single hydraulic actuator 420 is operatively coupled to each set of rollers 130 positioned between the input discs 120, 122 and the output disc 124. However, in other embodiments, a single hydraulic actuator 420 may be operatively coupled to each roller 130 in an in-line configuration.

The contact angle or inclination of the rollers 130 with respect to the discs 120, 122, 124 is indicative of the variator ratio and the torque of the variator 102. For example, if the rollers 130 the input variator discs 120, 122 toward the axial center and contact the output variator disc 124 away from the axial center (see position 210 in FIG. 2), the variator 102 has a relatively low variator ratio (i.e., speed ratio of the output disc 124 to the input discs 120, 122) but a high torque. However, if the rollers 130 contact the input variator discs 120, 122 away from the axial center and contact the output disc 124 toward the axial center (see position 212 in FIG. 2), the variator has a relatively high variator ratio but a low torque. It should be appreciated that although the term "contact" is used herein to refer to the interaction between the rollers 130 and the discs 120, 122, 124, an amount of traction fluid is typically captured between each roller 130 and the respective disc 120, 122, 124 such that the roller may not actually or fully contact the disc 120, 122, 124. Additionally, it should be appreciated that as the rollers 130 are moved toward the extreme sides of the toroidal contact surfaces 200 of the discs 120, 122, 124 (i.e., toward the inner or outer rim of the toroidal contact surfaces 200), the contact angle or inclination of the roller 130 on the respective disc 120, 122, 124 decreases resulting in an increase of the contact normal force applied on the roller 130 by the input disc 120.

Figure 2:
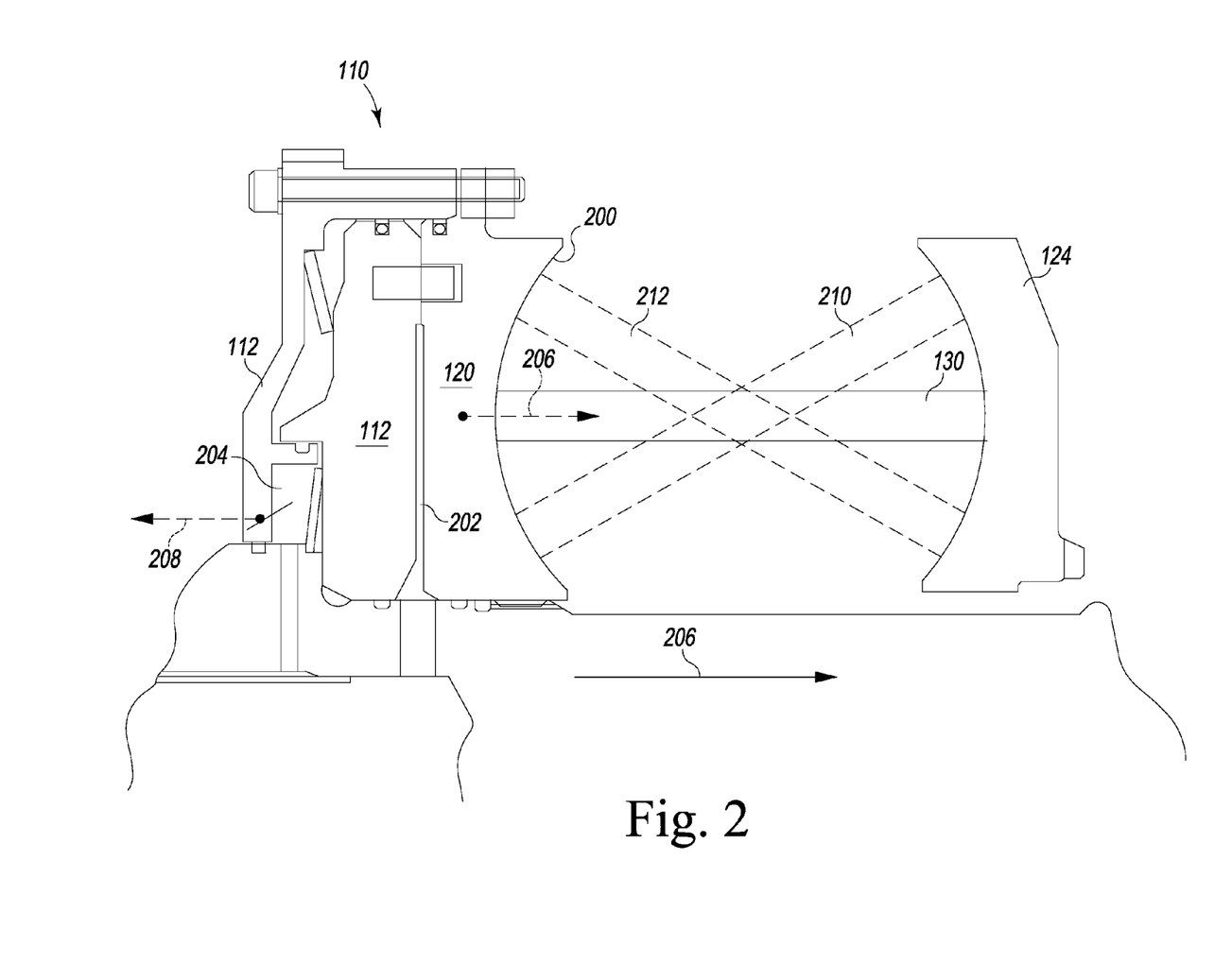
FIG. 2 is an elevational, sectional view of one embodiment of an endload assembly of the variator of FIG. 1.

As illustrated in FIG. 2, the endload assembly 110 includes the endload drum 112, the endload reaction plate 114, and the first input variator disc 120, which includes a toroidal contact surface 200 to receive the one or more rollers 130 as discussed above. The endload assembly 110 also includes an endload chamber 202 positioned between the endload reaction plate 114 and the first input variator disc 120. The endload chamber 202 is configured to be pressurized by an amount of fluid received in the endload chamber 202. Resultantly, the endload chamber 202 applies an amount of force to the first input variator disc 120 as indicated by arrow 206 based on the fluid pressure within the chamber 202. In this way, the first input variator disc 120 acts as a piston to apply force to the second input variator disc 122, the output disc 124, and the rollers 130 positioned therebetween.

The endload assembly 110 also includes a subtraction chamber 204. Illustratively, the subtraction chamber 204 is positioned between the endload drum 112 and the endload reaction plate 114 of the endload assembly 110 but may be positioned in another location in other embodiments. The subtraction chamber 204 is fluidly coupled to the endload chamber 202 via a valve 402 (see FIG. 4) and is configured to apply a subtractive force, as indicated by arrow 208, to the input disc 120 through the endload drum 112 when the valve is in the open or fluidly conductive position. In this way, the net force applied to the input disc 120 may be reduced by a predetermined amount. For example, in some embodiments, the subtraction chamber 204 is sized to reduce the net force applied to the input disc 120 by at least five percent when the valve 402 is moved to the open or fluidly conductive position. Additionally, in some embodiments, the subtraction chamber 204 is sized to reduce the net force applied to the input disc 120 by a value in the range of five percent to about ten percent with the valve 402 is moved to the open or fluidly conductive position. In one particular embodiment, the subtraction chamber 204 is sized to reduce the net force applied to the input disc 120 by about 7.5 percent when the valve 402 is moved to the open or fluidly conductive position.

As discussed in more detail below, the valve 402 may be moved to the open or fluidly conductive position based on one or more parameters of the variator 102. In some embodiments, the valve 402 is activated (i.e., moved to the open or fluidly conductive position) to reduce the net force applied to the input disc 120 based on the variator ratio of the variator 102. For example, in some embodiments, the valve 402 is activated when the variator ratio is greater than −0.5. Additionally, in some embodiments, the valve 402 is activated when variator ratio is less than −2.0. Further, in one particular embodiment, the valve 402 is activated to reduce the net force applied to the input disc 120 when the variator ratio is outside a variator ratio range of −0.5 to −2.0.

Alternatively, in some embodiments, the valve 402 may be activated to reduce the net force applied to the input disc 120 based on the position of the rollers 130. For example, in some embodiments, the valve 402 is activated when the point of contact between the roller 130 and the input disc 120, 122 (and/or output disc 124) is outside a predetermined range. In one particular embodiment, the valve 402 is activated to reduce the net force applied to the input disc 120 when the point of contact of the between the roller 130 and the input disc 120, 122 is outside the range of about 47 millimeters to about 88 millimeters measured from the longitudinal axis of the variator 102. Of course, other points of references may be used in other embodiments to determine the position of the rollers 130.

Further, in some embodiments, the valve 402 may be activated to reduce the net force applied to the input disc 120 based on the contact normal force multiplication value of the variator 102. The contact normal force multiplication value is the ratio of (i) the amount of contact normal force currently applied to the roller 130 by the input disc 120 to (ii) a minimum amount of contact normal force applied to the roller 130 by the input disc 120. In one particular embodiment, the valve 402 may be activated to reduce the net force applied to the input disc 120 when the endload force multiplication value is at least 1.07.

Figure 3:
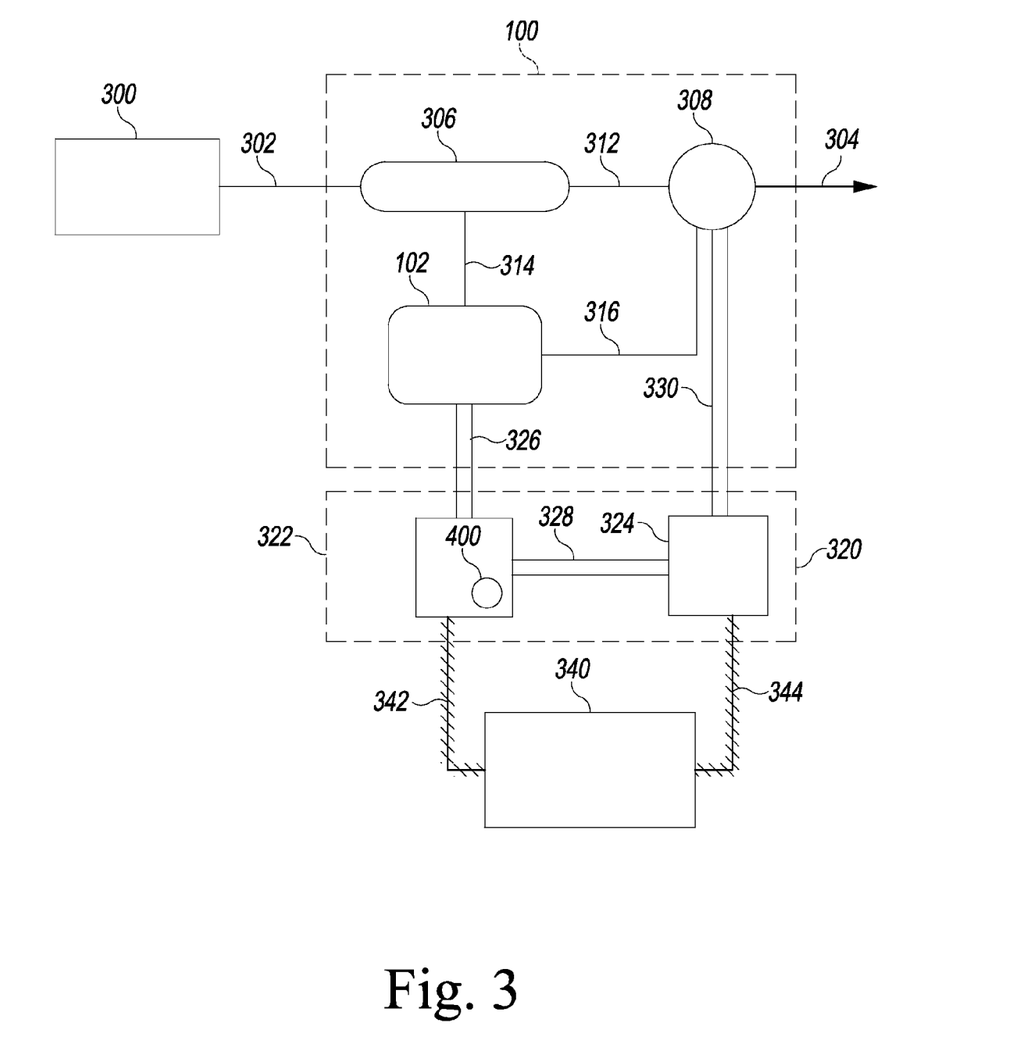
FIG. 3 is simplified block diagram of one embodiment of a system for controlling variator endload force usable with a vehicle transmission.

Referring now to FIG. 3, the transmission 100 may form a portion of a drivetrain of a vehicle. In such embodiments, the transmission 100 is operatively coupled to a transmission input shaft 302 to receive torque output generated by a vehicle drive unit 300. The drive unit 300 may be embodied as an internal combustion engine, such as a spark-ignited engine or a diesel engine, as an electric motor, as an engine-electric motor combination, or other engine or motor. The variator 102 is operatively coupled between the transmission input shaft 302 and transmission output shaft 304 via gearing 306 and one or more clutches 308. A number of linkages 312, 314, 316 mechanically couple the gearing 306, clutches 308, and variator 102 as will be understood by those skilled in the art.

The variator 102 and the clutches 308 of the transmission 100 are controlled by an electro-hydraulic control system 320. The electro-hydraulic control system 320 includes a variator control circuit 322 and a clutch control circuit 324. The variator control circuit 322 is fluidly coupled to the variator 102 via a plurality of fluid conduits 326 and to the clutch control circuit 324 via a plurality of fluid conduits 328. The clutch control circuit 324 is also fluidly coupled to the clutches 308 via a plurality of fluid conduits 330.

The variator control circuit 322 controls the variator ratio of the variator 102 as discussed in more detail below in regard to FIG. 4. The clutch control circuit 324 controls the application and release of the clutches 308. Aspects of the clutch control circuit 324 are the subject of a pair of related disclosures filed on the same date herewith, known as U.S. Utility patent application Ser. No. 12/957,872, and U.S. Utility patent application Ser. No. 12/957,877. The disclosures of both U.S. Utility patent application Ser. No. 12/957,872, and U.S. Utility patent application Ser. No. 12/957,877 are incorporated herein by this reference in their entirety for purposes of United States patent law.

The operation of the electro-hydraulic control system 320 is controlled by an electronic control unit 340. The electronic control unit 340 is electrically coupled to the variator control circuit 322 via a plurality of electrical connections 342 and to the clutch control circuit 324 via a plurality of electrical connections 344. The electrical connections 342, 344 may be embodied as any type of electrical connections or single paths capable of facilitating electrical communication between the electronic control unit 340 and the control circuits 322, 324. For example, the electrical connections 342, 344 may be embodied as insulated wiring, cables, wireless links, or other suitable interconnects for exchanging data, communications, and/or computer instructions therebetween. The electronic control unit 340 may be implemented as multiple separate logical or physical structures or as a single unit. For example, the electronic control unit 340 may control aspects of the operation of the drive unit 300 in addition to the transmission 100. Alternatively, the electronic control unit 340 may comprise a number of modules that control different aspects of the operation of the drive unit 300 and/or transmission 100.

The electronic control unit 340 may include computer circuitry configured to control the operation of the transmission 100 based on inputs from various components of the transmission 100 and, in some embodiments, from the drive unit 300. Such inputs may include digital and/or analog signals received from sensors, controls or other like devices associated with the vehicle components. The electronic control unit 340 processes inputs and parameters and issues electrical control signals to various components of the electro-hydraulic control system 320.

For example, the electronic control unit 340 monitors the status of valves in the electro-hydraulic control system 320. Sensing devices such as pressure switches or the like detect changes in valve positions within the electro-hydraulic control system 320 and send electrical signals to the electronic control unit 340 to indicate detected changes. The electronic control unit 340 executes computerized logic and instructions to determine, based on the signals received from the sensing devices, whether a fault has occurred in any of the components of the electro-hydraulic control system 320.

As shown in FIG. 3, the variator control circuit 322 includes an endload force control system 400, which includes the subtraction chamber 204 and the valve 402. As discussed above, the variator control circuit 322 may be configured to control the activation of the valve 402 based on one or more parameters of the transmission 100, the variator 102, and/or the drive unit 300. For example, in some embodiments, the variator control circuit 322 is configured to control activation of the valve 402 based on the variator ratio of the variator 102, the position of the rollers 130, the contact normal force multiplication value, or other parameter of the transmission 100, the variator 102, and/or the drive unit 300.

Figure 4:
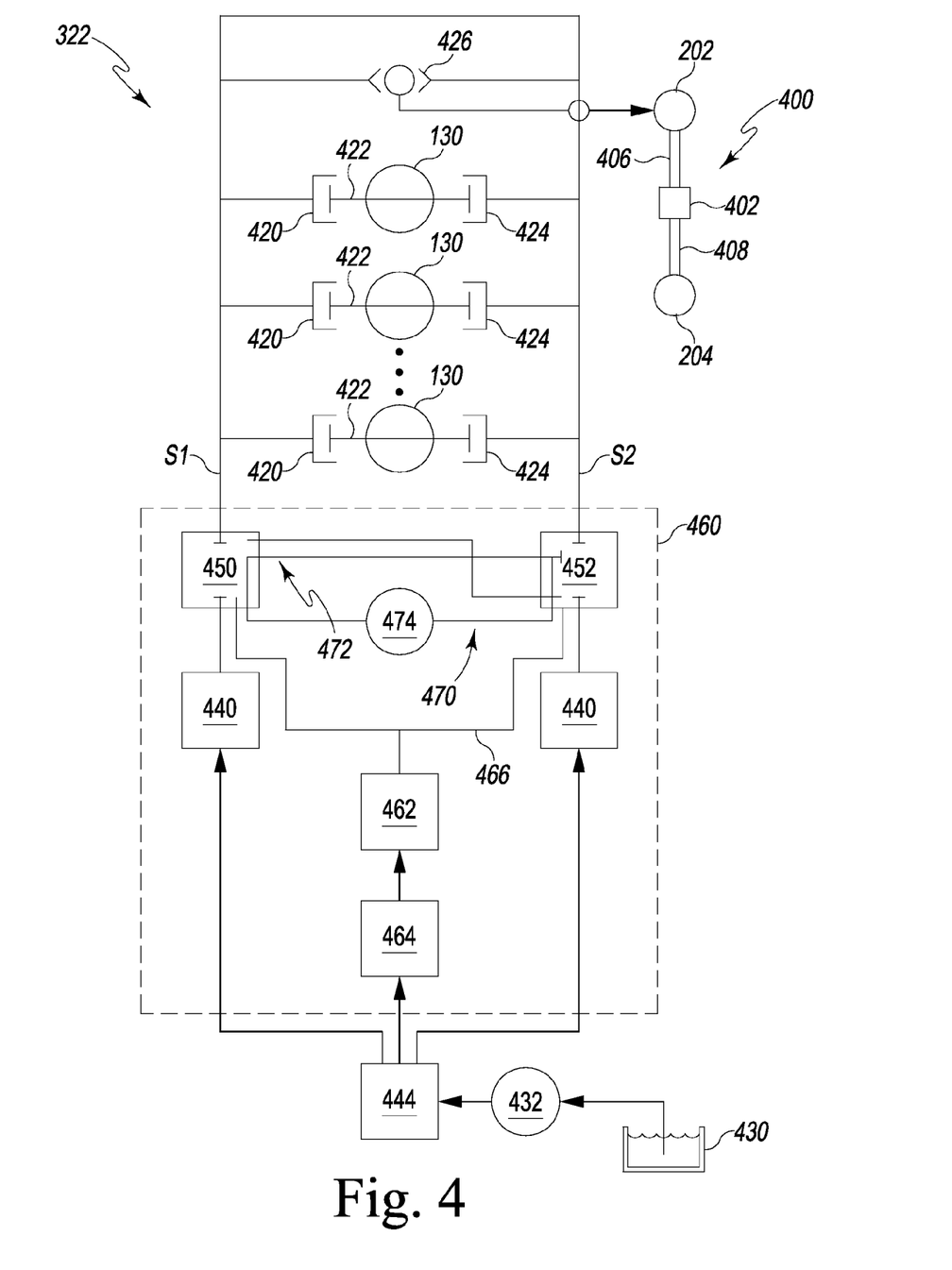
FIG. 4 is a simplified schematic of one embodiment of a hydraulic control circuit of the system of FIG. 3.

Referring now to FIG. 4, as discussed above, one or more hydraulic actuators 420 are operatively coupled to each of the variator rollers 130 to control the position of the roller 130 with respect to the input variator discs 120, 122 and output disc 124. In the illustrative embodiment, each hydraulic actuator 420 includes a double-acting piston 422 positioned in a cylinder 424. The hydraulic actuator 420 is responsive to a difference in two fluid pressures exerted on the double-acting piston 422 to move associated roller 130 as discussed below.

The pressure applied to one side of the hydraulic actuator 420 is commonly referred to as "S1," while the pressure applied to the opposing side is commonly referred to as "S2." A "higher pressure wins" valve 426 connects whichever of the two lines S1, S2 is at a higher pressure to the endload chamber 202. In this way, the difference between the S1 and S2 pressures results in torque at the variator output shaft 316. The direction of the torque output determines whether the torque application is positive or negative.

The variator control circuit 322 adjusts the pressures in the lines S1, S2. A source of hydraulic fluid (i.e., a sump) 430 supplies fluid to a pump 432. Electronically-controlled valves 440, 442, 444 regulate the fluid pressure that is applied to the lines S1 and S2. The valve 444 is a type of pressure control valve commonly referred to as a main modulator valve. The main modulator valve 444 modulates the fluid pressure according to a predetermined desired pressure level for the variator control circuit 322.

The valves 440, 442 are trim valves, each of which are includes a variable-bleed solenoid or similar device that outputs a variable fluid pressure in response to signals from the electronic control unit 340. The trim valve 440 is fluidly coupled to a shift valve 450 by a fluid passage 446, and the trim valve 442 is fluidly coupled to a shift valve 452 by a fluid passage 448. The trim valve 440 controls the application of fluid pressure to the line S1 through the shift valve 450, and the valve 442 controls the application of fluid pressure to the line S2 through the shift valve 452.

The illustrative variator control circuit 322 of FIG. 4 also includes a variator lockout valve system 460. In the variator lockout valve system 460, the position of the shift valve 450 determines whether or not the trim valve 440 supplies fluid pressure to the line S1, and the position of the shift valve 452 determines whether or not the trim valve 442 supplies fluid pressure to the line S2. The trim valve 440 is in fluid communication with the line S1 when the shift valve 450 is destroked. Similarly, the trim valve 442 is in fluid communication with the line S2 when the shift valve 452 is destroked.

The variator lockout valve system 460 also includes a trim valve 462 and a shift valve 464. The trim valve 462 is fluidly coupled to the shift valves 450, 452 by a passage 466. The trim valve 462 may be used to supply fluid pressure to the line S1 in the event that the trim valve 440 fails, and the trim valve 462 may be used to supply fluid pressure to the line S2 in the event that the trim valve 462 fails.

Aspects of the variator lockout valve system 460, including the trim valve substitution scheme, are described in a related disclosure filed on the same date herewith, known as U.S. Utility patent application Ser. No. 12/943,363. The disclosure of U.S. Utility patent application Ser. No. 12/943,363, is incorporated herein by this reference in its entirety for purposes of United States patent law.

The variator lockout valve system 460 also includes a fast valve actuation system 470, which is coupled between the trim valves 440, 442 and the remainder of the variator control circuit 322. The fast valve actuation system 470 has its own fluid circuit 472, which is coupled to a fluid supply 474. The fluid circuit 472 includes a pair of passages 480, 482, which fluidly couple the shift valves 450, 452 to each other.

It should be appreciated that the arrangement of the passages 480, 482 of the fast valve actuation system 470 prevents a state in which both of the shift valves 450, 452 are stroked at the same time. Further aspects of the fast valve actuation system 470 are described in a related patent application filed on the same date herewith, known as U.S. Utility patent application Ser. No. 12/943,322. The disclosure of U.S. Utility patent application Ser. No. 12/943,322 is incorporated herein by this reference in its entirety for purposes of United States patent law.

As discussed above, the endload force control system 400 includes the valve 402 in fluid communication with the endload chamber 202 and the subtraction chamber 204. For example, in one embodiment, the valve 402 includes a valve chamber having a first port coupled to a first fluid conduit 406, which is fluidly coupled to the endload chamber 202, and a second port coupled to a second fluid conduit 408, which is fluidly coupled to the subtraction chamber 204. In this way, the valve 402 is activateable to selectively connect and disconnect fluid communication between the endload chamber 202 and the subtraction chamber 204. As discussed above the valve 402 may be activated based on one or more parameters of the variator 102, the transmission 100, and/or the drive unit 300 including, for example, the variator ratio of the variator 102, the position of the rollers 130, the contact normal force multiplication value, or other parameter of the transmission 100, the variator 102, and/or the drive unit 300.

Figure 5:
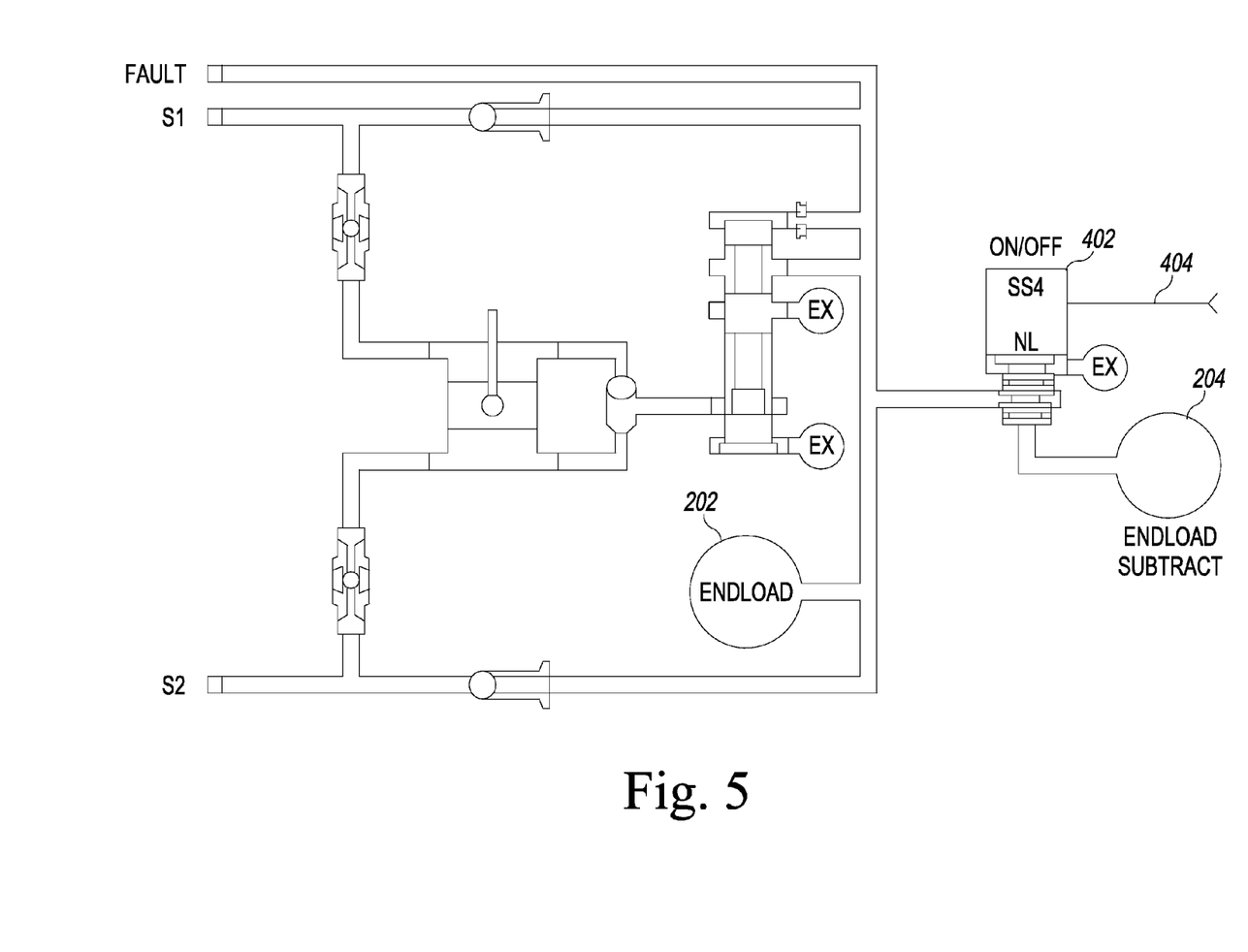
FIG. 5 is a simplified schematic of one embodiment of a hydraulic control circuit for controlling variator endload force of the hydraulic control circuit of FIG. 4.

As illustrated in FIG. 5, in some embodiments, the valve 402 may be embodied as an electronic solenoid-type valve. In such embodiments, the valve 402 is responsive to a command signal to move from a first, closed position in which the endload chamber 202 and the subtraction chamber 204 are not in fluid communication to a second, open position in which the endload chamber 202 and the subtraction chamber 204 are in fluid communication. Such command signals may be received from the electronic control unit 340 via one or more electrical connections 404. The electronic control unit 340 may be configured to generate such command signals (i.e., configured to activate the valve 402) based on one or more parameters of the variator 102, the transmission 100, and/or the drive unit 300 as discussed above. For example, in some embodiments, the electronic control unit 340 may be configured to determine the variator ratio of the variator 102 based on data received from one or more sensors and activate the valve 402 based on the determined variator ratio as discussed below in regard to FIG. 7. Additionally, in some embodiments, the electronic control unit 340 may generate such command signals based on data received from one or more position sensors coupled to one or more of the hydraulic actuators 420, or other linkage of the variator 102, to sense the relative position of the one or more rollers 130. Additionally or alternatively, the electronic control unit 340 may generate such command signals based on data received from one or more fluid sensors configured to sense the fluid pressure of the one or more components of the variator 102 such as, for example, the hydraulic actuators 420, the endload chamber 202, the subtraction chamber 204, and/or other component.

Figure 6:
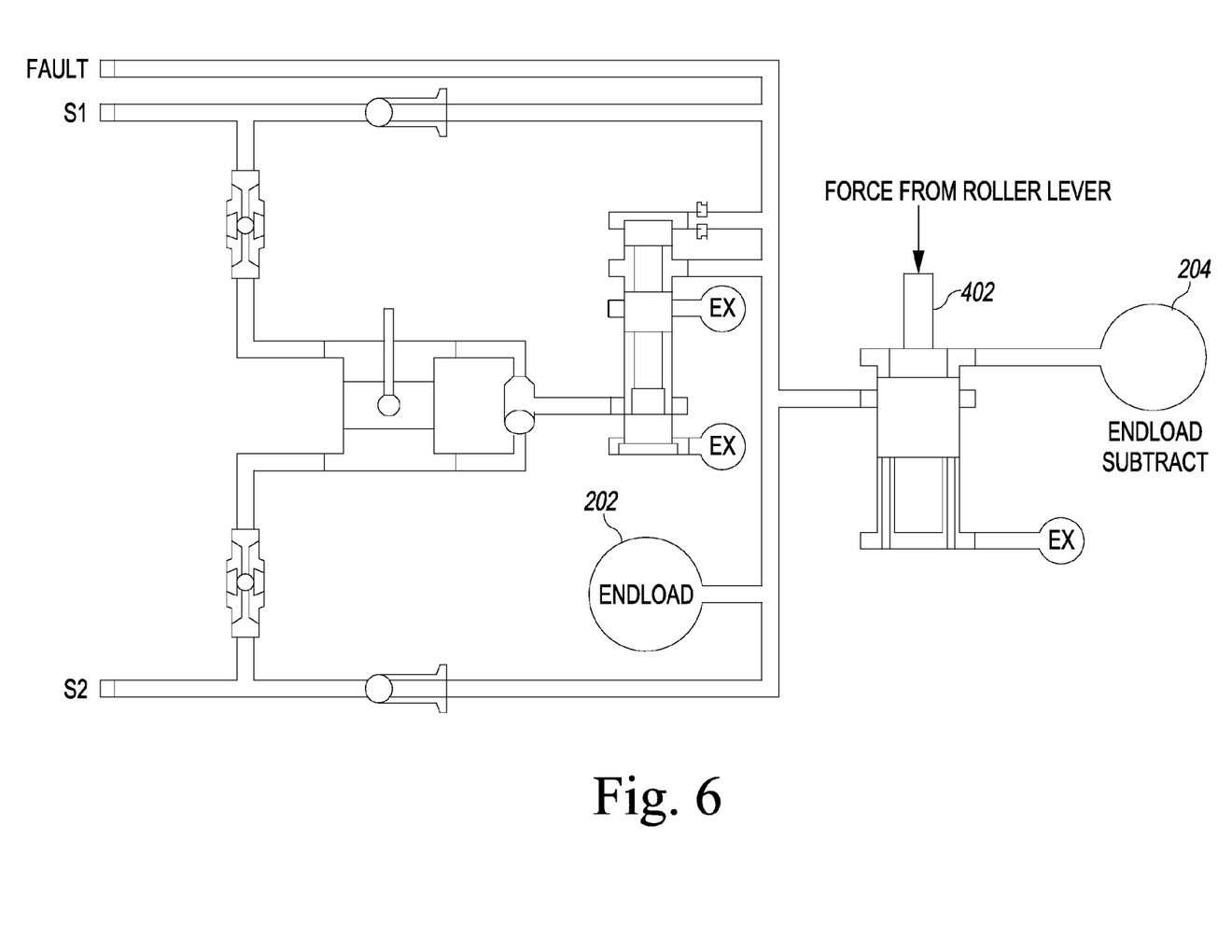
FIG. 6 is a simplified schematic of another embodiment of a hydraulic control circuit for controlling variator endload force of the hydraulic control circuit of FIG. 4.

Alternatively, as illustrated in FIG. 6, the valve 402 may be embodied as mechanical valve. In such embodiments, the valve 402 is mechanically coupled to one or more levers or other linkages of the roller 130 or the hydraulic actuator 420. In this way, the valve 402 is activated to move from a first, closed position in which the endload chamber 202 and the subtraction chamber 204 are not in fluid communication to a second, open position in which the endload chamber 202 and the subtraction chamber 204 are in fluid communication based on the positioning of the respective roller 130. For example, the valve 402 may be configured to be activated (i.e., move from the first position to the second position) when the contact radius/point or inclination of the roller 130 on the input disc 120, 122 falls outside of a predetermined range as discussed above.

Figure 7:
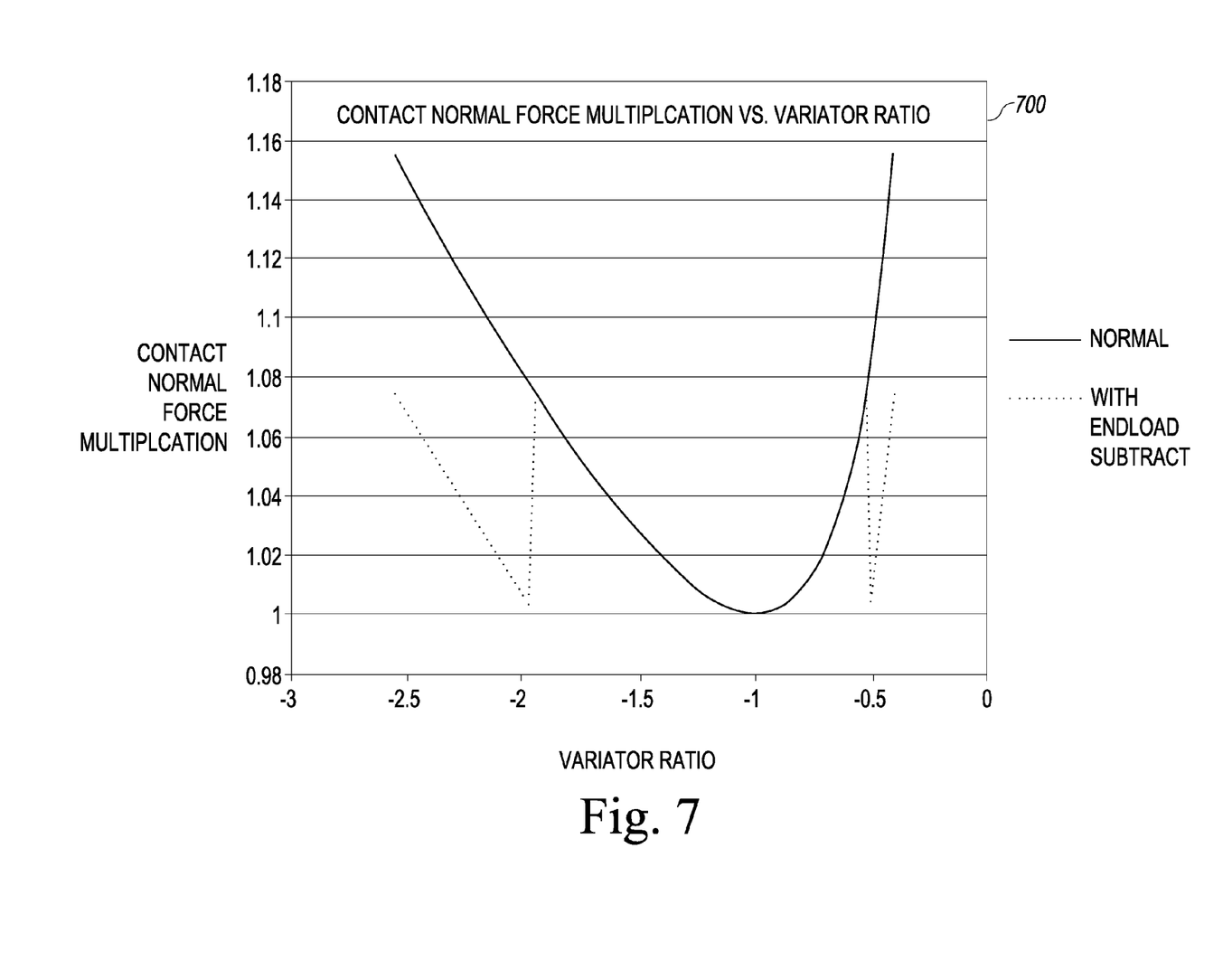
FIG. 7 is an illustrative graph of the contact normal force vs. variator ratio of the system of FIG. 2 using the variator described herein.

Referring now to FIG. 7, a graph 700 illustrates one illustrative control schema for controlling the endload force of the variator 102. In the illustrative embodiment, the valve 402 is activated based on the variator ratio of the variator 102. In particular, as shown in the graph 700, the valve 402 is activated to fluidly connect the endload chamber 202 and the subtraction chamber 204 to reduce the net force applied to the input disc 120, as discussed above, when the variator ratio is outside a variator ratio range of −0.5 to −2.0. As can be seen in the graph 700, when the valve 402 is activated, the contact normal force multiplication value of the variator 102 drops to near 1.0. In this way, the net force applied to the input disc 120 can be retained under a predetermined threshold such that the contact normal force applied to the rollers 130 does not drastically increase at extreme roller 130 inclination or contact radius/points.

As discussed above, in other embodiments, the valve 402 may be activated based on other parameters of the variator 102, the transmission 100, and/or the drive unit 300 as discussed above. For example, in some embodiments, the valve 402 may be activated to reduce the net force applied to the input disc 120 based on the position or inclination of the rollers 130, the endload force multiplication value of the variator 102, or other parameter. Additionally, as discussed above, activation of the valve 402 may be accomplished by mechanical linkage or electrical signals based in part on the type of valve 402 used.

There is a plurality of advantages of the present disclosure arising from the various features of the systems, devices, and methods described herein. It will be noted that alternative embodiments of the systems, devices, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:
1. A variator comprising:
an endload chamber configured to apply an amount of force to a variator input disc in a first direction based on fluid pressure within the endload chamber;

a subtraction chamber configured to apply an amount of force to the variator input disc in a second direction opposite the first direction based on fluid pressure within the subtraction chamber such that the net force applied to the variator input disc is reduced; and a valve having a first port fluidly coupled to the endload chamber and a second port fluidly coupled to the subtraction chamber, the valve being movable to a first position in which the endload chamber and the subtraction chamber are not fluidly coupled and to a second position in which the endload chamber and the subtraction chamber are fluidly coupled, wherein the subtraction chamber is sized to reduce the net force applied to the variator input disc by a percentage amount in the range of 5% to 10% when the valve is in the second position relative to the net force applied to the variator input disc when the valve is in the first position.

2. The variator of claim 1, wherein the valve is a solenoid valve responsive to a control signal to move to the second position.

3. The variator of claim 1, further comprising:

a variator output disc, the variator input disc being biased toward the variator output disc by the net force applied to the variator input disc; and at least one roller located between the variator input disc and the variator output disc to transmit torque from the input disc to the output disc, the at least one roller being positionable with respect to the variator input disc and the variator output disc to adjust a variator ratio of the variator.

4. The variator of claim 3, wherein the amount of force applied by the variator input disc is dependent upon the position of the roller.

5. The variator of claim 3, wherein the valve is configured to move to the second position when the variator ratio is greater than −0.5.

6. The variator of claim 3, wherein the valve configured to move to the second position when variator ratio is less than −2.0.

7. The variator of claim 3, wherein the valve configured to move to the second position when variator ratio is outside a variator ratio range of −0.5 to −2.0.

8. The variator of claim 3, wherein:

the position of the at least one roller on the variator input disc defines a contact point, and the valve is configured to move to the second position when the contact point is outside the range of 47 millimeters to 88 millimeters from a predetermined reference point.

9. The variator of claim 1, wherein the subtraction chamber is sized to reduce the net force applied to the variator input disc by about 7.5% when the valve is in the second position.

10. The variator of claim 1, further comprising:

a variator output disc, the variator input disc being biased toward the variator output disc by the net force applied to the variator input disc; and a roller located between the variator input disc and the variator output disc to transmit torque from the input disc to the output disc, the variator input disc applying a contact normal force on the roller, wherein the ratio of (i) the amount of contact normal force applied to the roller by the variator input disc to (ii) a minimum amount of contact normal force applied to the roller by the variator input disc defines a contact normal force multiplication value, and the valve is configured to move to the second position when the contact normal force multiplication value is at least 1.07.

* * * * *